March 31, 1964 M. F. WILLIAMS 3,127,565

PRECISION PEAK VOLTAGE MEMORY CIRCUIT

Filed Feb. 21, 1961

INVENTOR.
MEREDITH F. WILLIAMS

BY

George J. Rubens
ATTORNEY

United States Patent Office 3,127,565
Patented Mar. 31, 1964

3,127,565

PRECISION PEAK VOLTAGE MEMORY CIRCUIT

Meredith F. Williams, Hawthorne, Calif., assignor, by mesne assignments, to the United States of America as represented by the Secretary of the Navy Filed Feb. 21, 1961, Ser. No. 90,896
3 Claims. (Cl. 328—127)

The present invention relates to a precision peak voltage memory circuit and more particularly to a peak voltage memory circuit which minimizes errors due to any nonlinearities within the circuit itself.

It is necessary to obtain the maximum value of arbitrary wave forms in many fields such as computing, instrumentation, testing (including reliability studies), process control, biological and medical research, human engineering, transients in power systems during fault conditions, etc. Two factors have made it difficult to obtain acceptable accuracy from diode and capacitor combinations except in rapidly recurrent functions. One factor includes such considerations as the discharge or leakage current of the memory capacitor varying with the reverse resistance of the diode, the leakage resistance of the capacitor and the loading effect of the readout device. The other factor is the nonlinear forward resistance of the diode which varies inversely with the current flow, meaning that within the memory circuit the error caused by the nonlinear time constant will vary with the magnitude of the input function. The present invention reduces error caused by nonlinearities within the memory circuit such as that mentioned in the second factor. The present invention will memorize a peak voltage with errors typically less than .01 percent for input functions having slopes of several hundred thousand volts per second over a range of 0 to 100 volts. This is accomplished by employing a high gain servo loop to force an integrating network or amplifier having the diode and capacitor combination to follow the circuit input, the diode being at the input of the network so that the capacitor is unidirectionally charged.

An object of the present invention is to provide a circuit which will more precisely measure peak voltages.

Another object is to provide a memory circuit which has means for reducing error due to nonlinearities within the circuit itself.

A furter object is to provide a circuit for diminishing error due to nonlinear forward resistance of a diode in a diode capacitor memory device.

Other objects and many of the attendant advantages of the invention will be readily apparent as the disclosure is made in the following detailed description of a preferred embodiment of the invention as illustrated in the accompanying sheet of drawing in which.

Figure 1:
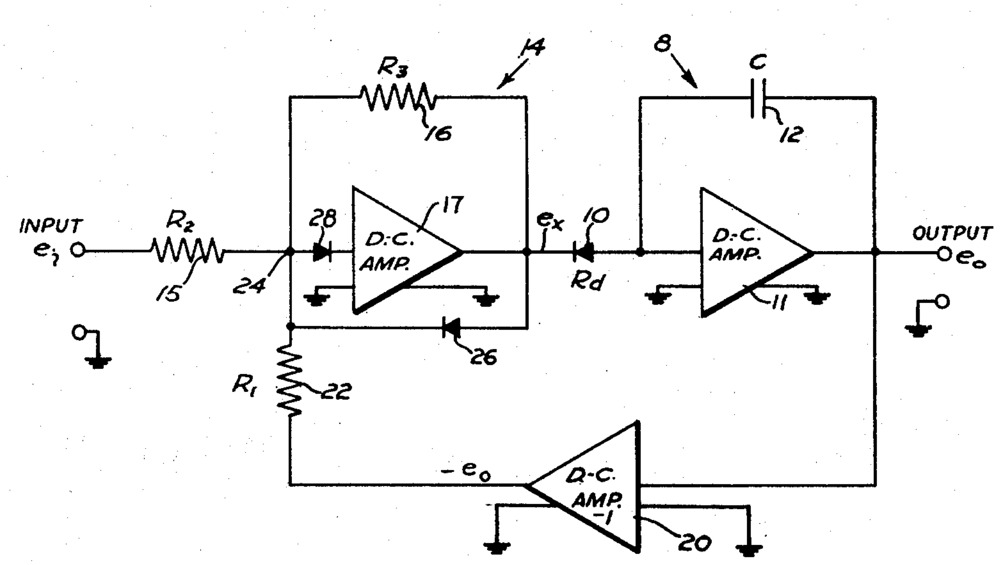
FIG. 1 is a diagram of the precision peak voltage memory circuit.

Referring now to the drawing wherein like reference numerals designate like or corresponding parts throughout the several views there is shown in FIG. 1 an integrating network 8 having a diode 10, or similar device, at the input of an amplifier 11 and a capacitor 12 connected across the amplifier, the output of the amplifier being connected to the circuit output. A charging network 14, connected to the circuit input through a resistor 15, has a return loop including a resistor 16 connected across a second amplifier 17, the output of this amplifier being connected to the diode 10. A feedback circuit, connected between the capacitor 12 and the input of the amplifier 17 has a no-gain amplifier 20 for reversing polarity and a resistor 22, the resistor 22 having the same resistance as the resistor 15.

In the operation of the device the diode 10 conducts only one polarity from the charging network 14 so as to unidirectionally charge the capacitor 12, the particular polarity not being important since the diode 10 could be reversed so as to allow the capacitor 12 to charge in the other direction. The capacitor 12 is charged through the diode 10 by the charging network 14 when the network receives at the input of the amplifier 17 a voltage proportional to the circuit input voltage $e_i$. The return loop including resistor 16 immediately cuts off the amplifier 17 after it has received an input voltage. When there is any difference in the voltage between the output voltage $e_o$ memorized by capacitor 12 and the input voltage $e_i$ this difference will be determined by a summing process at point 24 within the charging network, the feedback loop from the capacitor introducing at the summing point 24 a voltage proportional to the reverse polarity of the output voltage $e_o$. Since the resistor 15 is equal in resistance to the resistor 22 the sum of the input voltages at point 24 will, of course, reflect the difference between the input voltage $e_i$ and the output voltage $e_o$. The difference in voltages at point 24 is fed into the amplifier 17 which in turn forces the integrating network to follow the input voltage $e_i$ so that the capacitor 12 will memorize with precision the input voltage $e_i$. Accordingly, errors due to nonlinearities within the circuit such as that due to the nonlinear forward resistance of the diode are overcome or at least diminished so that precision is obtained within the circuit. The capacitor 12 will memorize only the highest or peak voltage $e_i$ of a particular polarity, any opposing polarity being obstructed by the diode 10. Further, after the capacitor 12 has memorized a particular voltage it will not be further charged until the input voltage $e_i$ exceeds the output voltage $e_o$ since the amplifier 17 will not receive an input signal until the voltage at point 24 due to the input $e_i$ exceeds the voltage due to the feedback loop connected to the capacitor 12. When $e_i$ does exceed $e_o$ the difference will be reflected at point 24 and fed into the amplifier 17 thereby causing the capacitor 12 to be additionally charged to measure the new peak, the errors due to nonlinearities within the circuit being cared for by the feedback loop.

In the analysis of the circuit the diode 10 is noted as a resistor $R_d$ and the resistors, the amplifiers and the capacitor are given nomenclature as noted in FIG. 1. The derivation of the transfer function $$\frac{e_o}{e_i}$$

is as follows:

$$\frac{R_3}{R_1}=\frac{R_3}{R_2}=-K \text{ gain of the amplifier 17} \quad (1)$$

$$e_x=-K(e_i-e_o), \text{ output of the amplifier 17} \quad (2)$$

$$e_o=-\frac{1}{R_dC}\int e_x dt, \text{ output of the amplifier 11} \quad (3)$$

In operational notation, $$e_o=\frac{-e_x}{R_dCP}$$

Substituting Equation 2 in Equation 3

$$e_o=\frac{+K(e_i-e_o)}{R_dCP} \quad (4)$$

Rearranging Equation 4 the transfer function is obtained $$\frac{e_o}{e_i}=\frac{K}{K+R_dCP}=\frac{K}{K+\tau P} \quad (5)$$

In order to determine the response of the system for a given error $$\% \text{ error} = \epsilon = 10^2 \frac{e_i - e_o}{e_i} \quad (6)$$

Solving Equation 5 for $e_o$ and substituting it in Equation 6

$$\epsilon = 10^2 \frac{e_i - e_i\left(\dfrac{K}{K+\tau P}\right)}{e_i}$$

$$\epsilon = \frac{10^2 + \tau P}{K + \tau P} \quad (7)$$

Substituting $j\omega$ for P in the error term (Equation 7) the frequency response $$\epsilon = \frac{10^2 \tau j\omega}{K + \tau j\omega} \quad (8)$$

Combining the vectors and solving for frequency:

$$\epsilon = \frac{10^2 \tau \omega}{(K^2 + \tau^2\omega^2)^{1/2}}, \quad \epsilon^2 (K^2 + \tau^2\omega^2) = (10^2 \tau\omega)^2$$

$$\epsilon^2 K^2 = (10^2\tau\omega)^2 - (\epsilon\tau\omega)^2, \quad F^2 = \frac{e^2 K^2}{(10^2 \tau 2\pi)^2 - (\epsilon\tau 2\pi)^2}$$

$$f = \frac{\epsilon K}{2\pi\tau (10^4 - \epsilon^2)^{1/2}} \quad (9)$$

Substituting typical circuit values in (9), e.g., $\tau = R_d C = 5(10)^2\ (10)^{-7} = 5(10)^{-5}$ and $K = 2(10)^3$ For an error of 1% then $f_{max}$ would be:

$$f = \frac{(1)(2)(10)^3}{2\pi(5)(10)^{-5}(10^4 - 1)^{1/2}} = 64{,}400 \text{ c.p.s.}$$

The current capacity requirements of amplifiers 11 and 17 may be found as follows:

$$q = Ce, \quad q = \text{charge in coulombs} \quad (10)$$

Differentiating Equation 10

$$i = \frac{dq}{dt} = C\frac{de}{dt} \quad (11)$$

To obtain $$\frac{de}{dt}$$

in terms of frequency let $$e = E \sin \omega t, \quad E = e \text{ maximum} \quad (12)$$

Differentiating Equation 12

$$\frac{de}{dt} = \omega E \cos \omega t \quad (13)$$

Being interested in the maximum slope Equation 13 is evaluated when $t=0$ $$\frac{de}{dt} = \omega E \quad (14)$$

Substituting (14) into (11) (15)

$$i = \omega CE \text{ or } i = 2\pi f CE \quad (16)$$

Again substituting some typical value, e.g., $i_{max} = 3(10^{-2})$, $C = 1 \times 10^{-7}$ farads, $E = 100$ volts and solving for frequency $$f = \frac{i}{2\pi CE} = \frac{3 \times 10^2}{(2\pi)(1 \times 10^{-7})(1 \times 10^2)}$$

$$= 477 \text{ c.p.s. at 200 v. peak to peak} \quad (17)$$

In terms of slope, from Equation 14

$$\frac{de}{dt} = \omega E = 2\pi(477)(100) = 300{,}000 \text{ volts/sec.} \quad (18)$$

Figure 2:
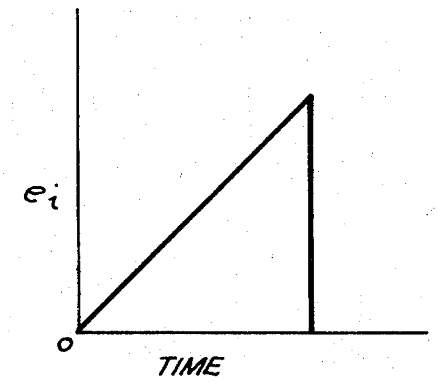
FIG. 2 represents an example of a simple input transient to the circuit of FIG. 1.

To complete the analysis the response of the system to the simple transient shown in FIG. 2 is determined. Assuming $$\frac{de_i}{dt} = M = \text{a constant, and} \quad (19)$$

$$e_i = \int_0^t M dt = Mt \quad (20)$$

Substituting this function into Equation 5 and rearranging, there is a first order linear differential equation $$\frac{de_o}{dt} + \frac{K}{\tau} e_o = \frac{KMt}{\tau} \quad (21)$$

The general solution of Equation 21 is $$e_o = \frac{M\tau}{K}\left(e^{-\frac{K}{\tau}t} - 1\right) + Mt \quad (22)$$

and $$\epsilon = \frac{100\tau}{Kt}\left[e^{-\frac{Kt}{\tau}} - 1\right] = \text{percentage error} \quad (23)$$

Referring to the slope value given in Equation 18

$$\frac{de_i}{dt} = 3(10)^5 \text{ volts/sec.} = M$$

it would take $$\frac{10^{-3}}{3} \text{ sec. to reach 100 volts}$$

Substituting in Equation 23

$$\epsilon = \frac{1(10)^2 5(10)^{-5}}{2(10)^3 \dfrac{(10)^{-3}}{3}} \quad (24)$$

$$\left[e^{\frac{-2(10)^3(10)^{-3} - 1}{5(10)^{-5}(3)}}\right]$$

$$\epsilon = 7.5(10)^{-3}$$

$$\epsilon = 0.0075 \text{ percentage error}$$

The frequency response characteristics of the operational amplifiers 11 and 17 have been ignored. However, it is reasonable to expect in computing applications that they will be identical thus presenting no difficulty. It is to be understood that for high frequency applications (such as measuring peaks in random noise, pulse work etc.) the circuit can be designed to satisfy this band width requirement without deviating from the spirit of the invention.

The circuit description and analysis up to this point considers only the dynamics of the memory "tracking" process. Additional circuitry must be added to prevent serious drift errors from being introduced during the hold periods ($e_o > |e_i|$). This is easily demonstrated as follows:

Referring to FIG. 1, if the output of amplifier 11, $e_o$, has a value and $e_i$ is less than or equal to zero, the voltage, $e_x$, at the output of amplifier 17, will be quite large. Writing an expression for the amplifier 11 and referring to the reverse resistance of diode number 10 as $R_{dr}$, $$\frac{de_o}{dt} = \frac{e_x}{CR_{dr}} \quad (25)$$

Inserting some typical values in Equation 25, ($C = 10^{-7}$, $R_{dr} = 10^8$, $e_x = 10^2$) the drift rate is $$\frac{de_o}{dt} = \frac{10^2}{10^{-7} \times 10^8} = 10 \text{ volts per second}$$

This is unacceptable; however, it can be reduced by a large factor.

First, a diode 26 is connected across the amplifier 17 with its forward path from the output of amplifier 17 back to the amplifier's input or summing point 24 so that positive values of $e_x$ will be largely suppressed. Again computing the results in terms of the output $e_o$ and referring to the amplifier 17 with the diode 26 connected as above $$e_x = -e_o \frac{R_{df}}{R_{22}} \qquad (26)$$

where $R_{df}$ is the forward resistance of the diode 26. Substituting Equation 26 into Equation 25

$$\frac{de_o}{dt} = -e_o \frac{R_{df}}{R_{22}} \frac{1}{C R_{dr}} \qquad (27)$$

Putting in the values a much lower drift rate $$\frac{de_o}{dt} = -10^2 \frac{(5\times10^2)}{10^5} \frac{1}{10^{-7}10^8} = .05 \text{ volt per second}$$

is attained, but it is still excessive for many applications.

An additional diode 28 is connected between the point 24 and the grid input of amplifier 17, directing the forward path towards the grid input so as to further reduce the magnitude of positive values of $e_x$, i.e., $$\frac{de_o}{dt} = -e_o \frac{R_{df}}{R_{dr}} \frac{1}{C R_{dr}} \qquad (28)$$

or $$\frac{de_o}{dt} = -10^2 \left[ \frac{5\times10^2}{10^8} \frac{1}{(10^{-7})\times10^8} \right] = 5\times10^{-5} \text{ volts per second}$$

for a total reduction in drift of $2\times10^5$. Therefore, now the drift is much less than the drift one can expect from other parasitic sources.

It is now apparent that the present invention provides a memory circuit which has means for substantially eliminating any errors due to nonlinearities within the circuit. By employing a high-gain servo loop to force an integrating network including a memory capacitor and a diode to follow an input voltage, errors such as that due to the nonlinear forward resistance of the diode are substantially eliminated.

Obviously many modifications and variations of the present invention are possible in the light of the above teachings. It is, therefore, to be understood that within the scope of the appended claims the invention may be practiced otherwise than as specifically described.

I claim:

1. A precision peak voltage memory circuit comprising a memory capacitor in series with a diode, the diode being responsive to an input signal so as to unidirectionally charge the capacitor, an amplifier connected across said capacitor and in series with the diode so that the capacitor and the resistance of the diode cause the amplifier to act as an integrator, a feedback loop having a non-gain amplifier connected between the capacitor and a summing point, another amplifier connected between the summing point and the diode and having a return loop connected from its output to said summing point, an input lead responsive to the input signal connected to said summing point, the input lead and the feedback and return loops each having a resistor interposed therealong so as to introduce a resistance along the conductive path of the lead and each of the loops, the resistances of the resistor in the input lead and the feedback loop being equal whereby the charge on the capacitor is forced to follow the input signal so as to substantially eliminate any errors due to nonlinearities within the circuit.

2. A precision peak voltage memory circuit comprising a memory capacitor connected on one side to a first diode, and on an opposite side to an output lead, the diode being responsive to an input signal so as to unidirectionally charge the capacitor, a first amplifier connected across said capacitor and in series with the diode so that the capacitor and the resistance of the diode cause the amplifier to act as an integrator, a feedback loop having a second amplifier with no gain connected between the capacitor and a summing point, a third amplifier connected between the summing point and the diode and having a return loop connected from its output to said summing point, an input lead responsive to the input signal connected to said summing point, the input lead and the feedback and return loops each having a resistor, interposed therealong so as to introduce a resistance along the conductive path of the lead and each of the loops, the resistor in the feedback loop being connected between the second amplifier and the summing point, the resistances of the resistor in the input lead and the feedback loop being equal so that the charge on the capacitor is forced to follow the input signal so as to substantially eliminate any errors due to nonlinearities within the circuit, a diode connected across the third amplifier with its forward resistance path from the output of the third amplifier to the input of the third amplifier, another diode connected between said summing point and the input of the third amplifier whereby drift errors of the circuit are minimized during periods when the output voltage is greater than the input voltage.

3. A precision peak voltage memory circuit comprising a memory capacitor in series with a diode, the diode being responsive to an input signal so as to unidirectionally charge the capacitor; an amplifier connected across said capacitor and in series with the diode so that the capacitor and the resistance of the diode cause the amplifier to act as an integrator; means responsive to a charge stored on said capacitor and connected to an input lead for comparing said charge with the input signal and for introducing a signal proportional to the difference between the capacitor charge and the input signal into said diode whereby the capacitor is forced to follow the input signal so as to substantially eliminate any error due to nonlinearities within the circuit; said means responsive to the charge stored on said capacitor including a summing point receiving both the input signal and the charge on said capacitor and a feedback loop connecting said capacitor to the said summing point whereby addition of voltages at the said summing point will reflect the difference between the charge on the capacitor and the input signal; and means also including a first amplifier having its input connected to the said summing point and its output connected to the said diode; said first amplifier having a return loop connected between the output of the amplifier and the said summing point; said feedback loop including a second no-gain amplifier having its input connected to said capacitor and its output connected to said summing point; said input lead, said feedback loop, and said return loop each incorporating an impedance which acts to introduce a resistance in each of said input leads, feedback loop, and return loop, the value of the resistance in each of the said input lead, feedback loop and return loop being equal, whereby proportional voltages are developed at the said summing point.

References Cited in the file of this patent

UNITED STATES PATENTS

| | | |
|---|---|---|
| 2,846,577 | Blasingame | Aug. 5, 1958 |
| 2,854,630 | Fogelberg et al. | Sept. 30, 1958 |
| 2,855,513 | Hamburgen | Oct. 7, 1958 |
| 2,890,832 | Stone | June 16, 1959 |
| 2,962,217 | Landsman | Nov. 29, 1960 |
| 2,988,702 | Newbold | June 3, 1961 |